UNITED STATES PATENT OFFICE.

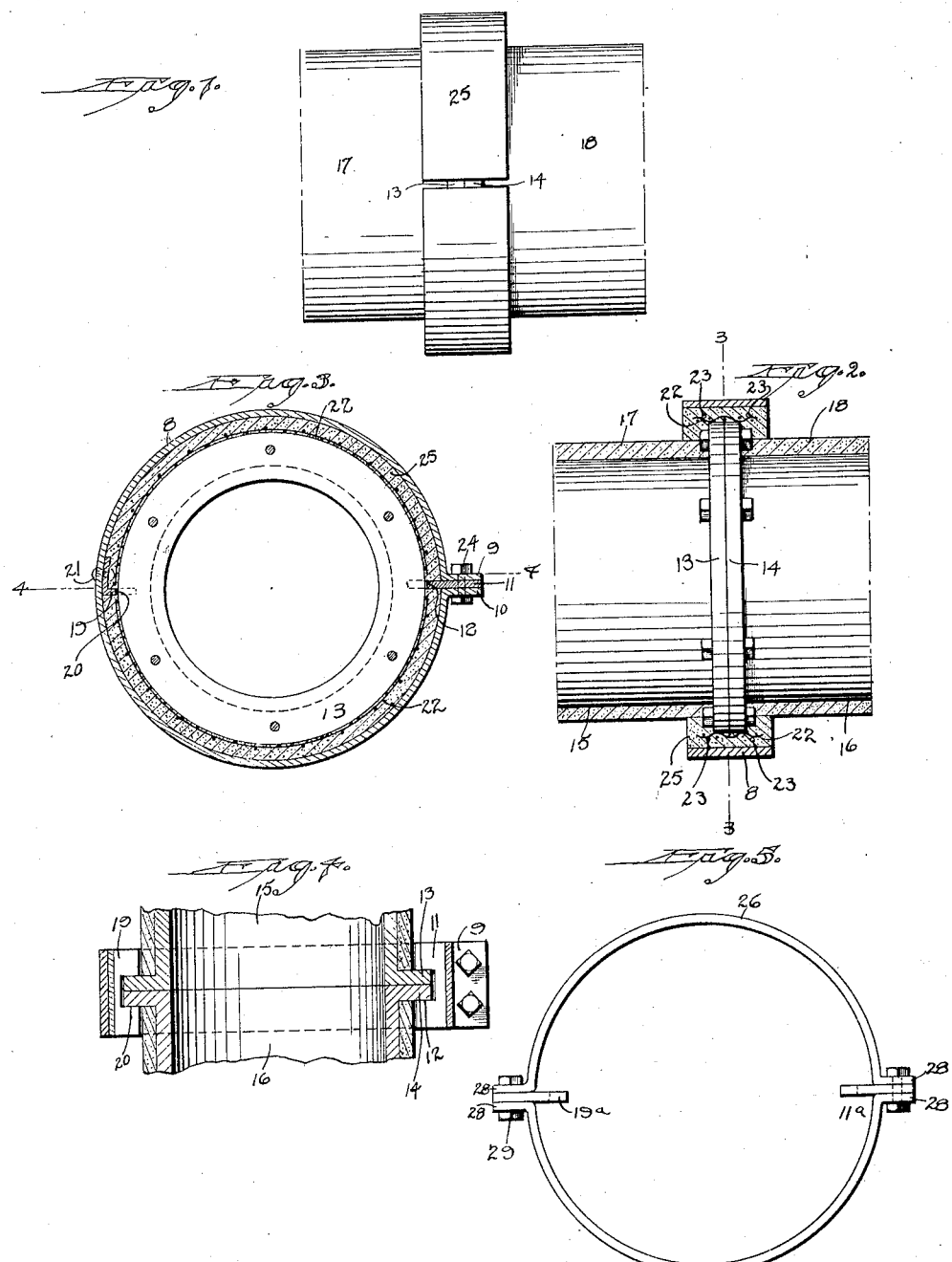

JOHN BUDINICH, OF UNION HILL, NEW JERSEY.

MOLD FOR ASBESTOS FLANGES.

1,328,817.   Specification of Letters Patent.   Patented Jan. 27, 1920.

Application filed June 10, 1919. Serial No. 303,070.

*To all whom it may concern:*

Be it known that I, JOHN BUDINICH, a citizen of Croatia, residing at Union Hill, in the county of Hudson and State of New Jersey, have invented a new and useful Improvement in Molds for Asbestos Flanges; and I do hereby declare the following, when taken in connection with the accompanying drawings and the characters of reference marked thereon, to be a full, clear, and exact description of the same, and which said drawings constitute part of this application, and represent, in—

Figure 1 a side view showing the connecting ends of two flanged pipes having an asbestos flange applied thereto.

Fig. 2 a longitudinal sectional view of the same, showing my improved mold in place.

Fig. 3 a sectional view on the line 3—3 of Fig. 2.

Fig. 4 a sectional view on the line 4—4 of Fig. 3.

Fig. 5 a plan view of a modified form embodying my invention.

This invention relates to an improvement in molds for forming asbestos flanges, particularly asbestos flanges adapted to be placed around the flanges on the ends of service pipes for water, steam and other uses. In covering flanged pipes the main portions are covered, leaving the flanges exposed, and then these flanges are covered by a flange formed by hand the performance of which requires the services of an experienced operator and the expenditure of a considerable amount of time. Furthermore in some districts, one of the requirements of the building laws is that the flanged joints may be inspected. The object of this invention is to provide a mold by which the asbestos flanges around the flanged joints of pipes may be readily formed, and when formed, can be removed without difficulty; and the invention consists in the construction hereinafter described and particularly recited in the claims.

In carrying out my invention, I employ a band 8 of suitable width and of length corresponding to the diameter of the flange to be formed. The ends 9 and 10 are turned outward and between them is located a flange plate 11 projecting into the ring formed by the band and formed with a notch 12 corresponding in dimensions to the dimensions of the flanges 13 and 14 on the ends of pipes 15 and 16 which have been provided with asbestos jackets 17 and 18 in the usual manner. In line with the flange plate 11 on the opposite side of the ring is a fixed flange plate 19 corresponding in dimensions to the flange plate 11 and formed with a notch 20. One end of this plate is curved against the inner wall of the band and secured thereto by rivets 21 or otherwise. When an asbestos flange is to be formed two strips of wire netting 22 will be placed around the flanges 13 and 14 and secured thereto by pieces of cord 23. The mold band is then placed around the ends of the pipes and the flange plates 11 and 19 set over the flanges 13 and 14 and between the ends of the strips of wire netting. The ends of the band are then connected by a bolt 24 which also not only couples the ends of the band together but secures the flange plate 11 in place. When thus located the space between the band and the ends of the pipe is filled with asbestos forming an asbestos flange 25 which is allowed to set and which requires but a short time. The bolt 24 is then removed and the ends of the band separated and removed from the flange 25 which is then covered with canvas and finished in the usual manner. Should it be necessary to examine the joint the flange 25, or half of it, may be readily removed by inserting a knife blade in the slots formed by the flange plates 11 and 19, and cutting the cords 23 which permits half of the flange to be pried out of engagement with the ends of the pipe and so removed. The wire netting forms a reinforce so that the flange maintains its shape and can be re-applied to the joint after inspection.

Instead of forming the mold band from a single piece of metal, it may be formed in two sections as shown in Fig. 5 of the drawings, each section 26 and 27 forming a half circuit with outwardly turned ends 28 between which flange plates 11ª and 19ª may be secured by bolts 29, the operation of forming an asbestos flange being precisely the same except in larger pipes or where heavier bands are employed, it will be more convenient to form the mold in two parts.

I claim:—

1. A mold for asbestos flanges formed from a band of metal, flange plates supported by said band and each formed in its inner edges with notches.

2. A mold for asbestos flanges formed from a single band of metal bent into circular form and having its ends turned outward, a flange plate secured between the outturned ends and projecting into a ring formed by the band, a second flange plate secured to the inner face of the band opposite the outwardly turned ends thereof, said flange plates formed in their inner edges with notches.

In testimony whereof I have signed this specification in the presence of two subscribing witnesses.

JOHN BUDINICH.

Witnesses:
FREDERIC C. EARLE,
CLARA L. WEED.